July 4, 1967  E. AESCHLIMAN  3,329,451
MITERED CORNER CONSTRUCTION FOR AN ARTICLE
OF FURNITURE OR THE LIKE
Filed March 31, 1965  2 Sheets-Sheet 1

INVENTOR.
Eugene Aeschliman
BY Nathan N. Kraus
Frank H. Marks
Att'ys

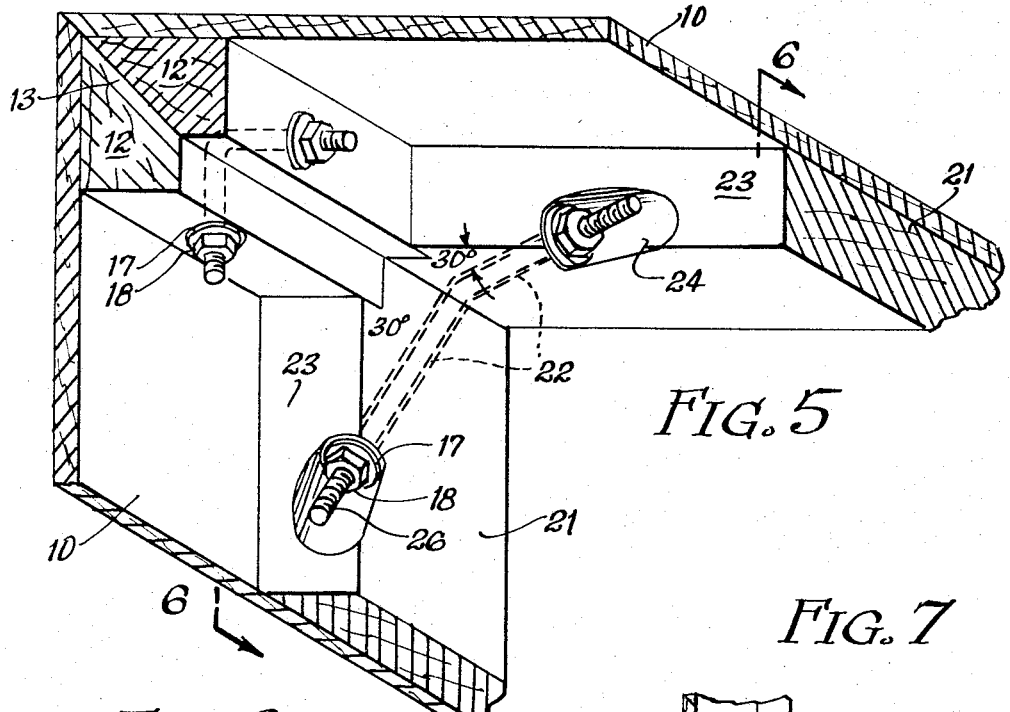
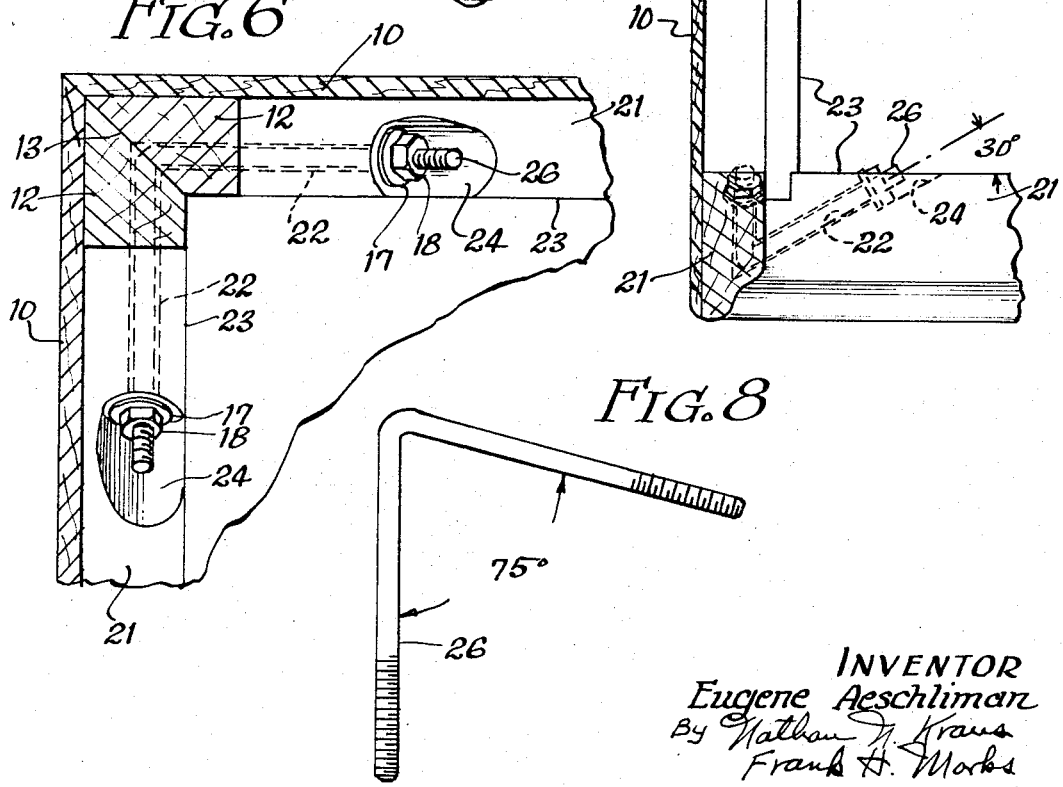
INVENTOR
Eugene Aeschliman
By Nathan J. Kraus
Frank H. Marks
Attys 3,329,451
MITERED CORNER CONSTRUCTION FOR AN
ARTICLE OF FURNITURE OR THE LIKE
Eugene Aeschliman, Jackson, Miss., assignor to MPI Industries, Inc., Jackson, Miss., a corporation of Illinois
Filed Mar. 31, 1965, Ser. No. 444,339
9 Claims. (Cl. 287—20.92)

ABSTRACT OF THE DISCLOSURE

A corner construction for knock-down furniture and the like formed of a pair of cooperating panels secured in rigid right angle relationship. Each panel has a cleat attached along one edge and a molding strip attached along an adjacent edge at a right angle to the cleat. Cooperating surfaces of the panels, cleats and molding strips are mitered and in abutment. The cleats and molding strips are bored, with cooperating bores being in registration and each bore receiving one leg of a threaded angle member having a nut for securing the parts together.

---

This invention relates to a mitered corner construction for articles of furniture and the like and to a method of forming the same.

One of the objects of my invention is the provision of a mitered corner construction for an article of furniture or the like permitting such article to be shipped in knock-down condition and then readily assembled at a point of use.

Another object of my invention is the provision of simple and economical means for securing mitered corner components in a manner as effective as a permanent corner construction.

A further object of my invention is the provision of a mitered corner construction for furniture requiring a minimum of skill and simple tools, such as a wrench or pliers, for assembly.

Other and further objects and advantages of my invention will become apparent from the following description when the same is considered in connection with the accompanying drawings in which, FIG. 1 is a fragmentary perspective view of cooperating corner components assembled in accordance with this invention;

FIG. 5 is a fragmentary perspective view of a modified embodiment of my invention.

FIG. 6 is a cross-sectional view taken substantially on line 6—6 of FIG. 5.

FIG. 7 is a fragmentary side view partly in cross-section; and

FIG. 8 is a plan view of a connecting member used in the modified embodiment.

Figure 1:
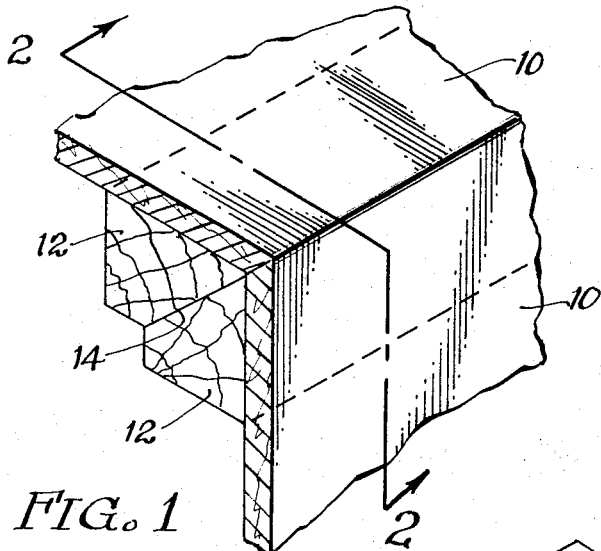
Figure 2:
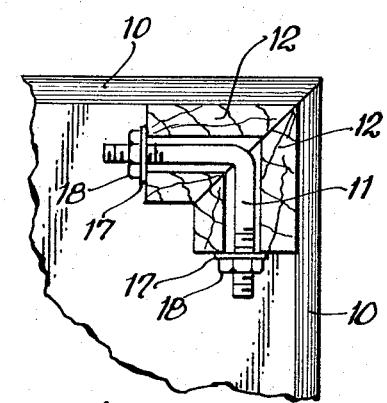
FIG. 2 is a cross-sectional view taken substantially on line 2—2 of FIG. 1.

The corner construction illustrated in the drawing may be utilized in any article of furniture or other construction for connecting adjacent parts or walls together so as to provide a mitered corner joint therefor.

Figure 3:
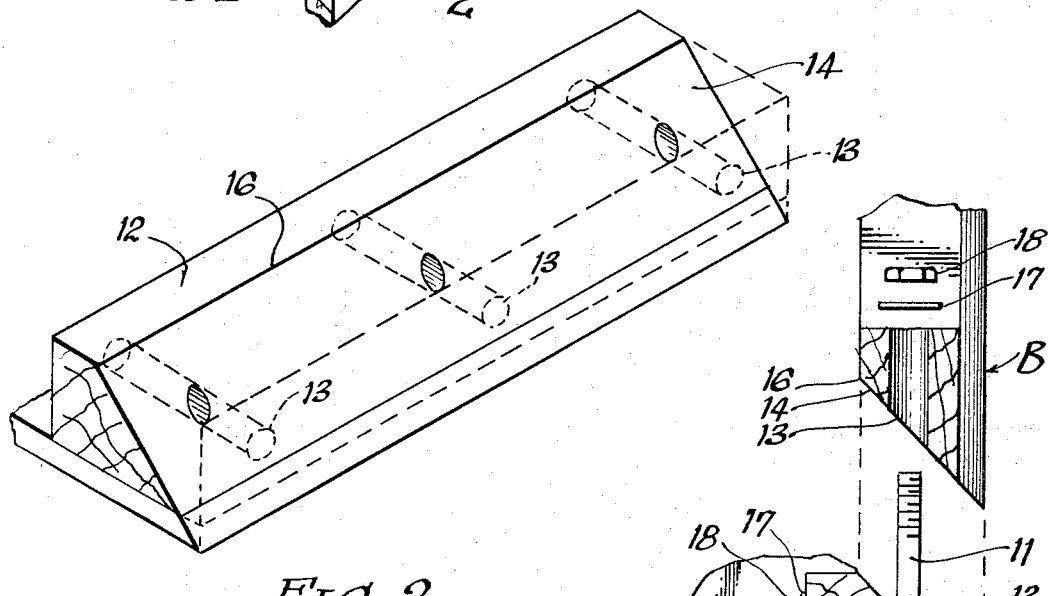
FIG. 3 is a perspective view illustrating one of the steps in forming a corner component in accordance with my invention.

Referring to the drawings, particularly FIGS. 1–4, an article of furniture or the like utilizing my invention may comprise a plurality of walls or panels 10 joined together by connecting clamp members, indicated generally by the numeral 11. Each panel 10 is provided on its inner face with a cleat 12 which is secured to said inner face, preferably as with a suitable adhesive, although other securing means may be employed. The cleat 12 extends along the marginal edge of the panel 10 and may be provided with a bevelled edge, as illustrated, prior to assembly to the panel. Preferably, to assure accurate alignment of the parts and to facilitate assembly, a cleat such as illustrated in FIG. 3 and having a generally rectangular cross-section, is attached to the marginal edge of the panel 10 so that the respective edge faces of cleat and panel are coplanar. The cleat 12 is then drilled at spaced points from the outer edge face thereof to provide a plurality of apertures or bores 13 for receiving the connecting members 11, hereinafter to me described. The edges of the assembled panel and cleat are then mitered at a 45° angle, the mitered surface 14 being continuous and extending from the outer edge corner of the panel 10 to a line 16 spaced from the inner edge of the cleat 12. As above prepared, each edge constitutes a corner component. It will be understood that as an alternate method the cleat may be drilled prior to assembly to the panel.

The drilled apertures 13 of cooperating corner components, of course, are disposed in registration.

Each of the connecting members 11 comprises a rod bent at right angles and threaded at both ends and each adapted to receive a washer 17 and a cooperating nut 18.

Figure 4:
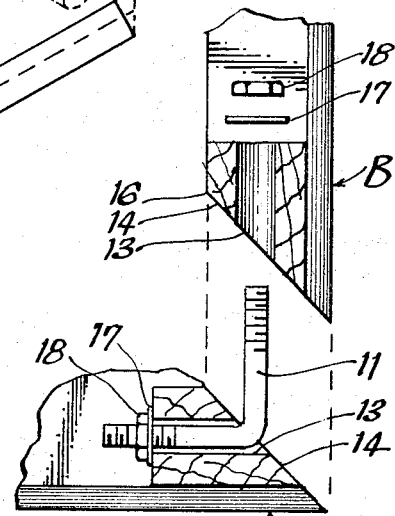
FIG. 4 is a view similar to FIG. 2 but showing the corner components rotated 90° and in dis-assembled relation and the manner in which said components are assembled with the connecting member.

Referring to FIG. 4, in assembling cooperating corner components, one end of the connecting member 11 is first inserted through an aperture 13 in the cleat of one of the components A an a washer and nut may be applied onto said end to hold the connector in position for assembly with the cooperating corner component B. The cooperating corner component B is assembled by moving the same towards the first component A in a direction at a right angle thereto to insert the free end of the connecting member 11 into the aperture 13 of component B. The components are then brought into tight relation by rotation of the nuts 18 at each end of the connector and are maintained in tight abutting relationship by the connecting members.

It should be apparent that the provision of a cleat 12 extending the full length of the edge of the panel 10 and preferably permanently secured thereto serves to rigidify the marginal edge of the panel which may comprise relatively thin plywood or Masonite board of the order of one-eighth to one-quarter inch in thickness. In such a case, the cleat 12 preferably should have a depth of about three-quarters of an inch and a width of approximately one and one-half inches before bevelling. As a result, after bevelling has been effected, the width of the bevelled or mitered surface is approximately one and one-quarter inches. This affords a substantial area for engagement with a like bevelled surface of a cooperating component whereby the components are firmly and rigidly connected together. The components, however, may be readily disassembled, in the event that an article of furniture embodying said components is to be knocked-down for purposes of shipment.

Referring to the modified embodiment illustrated in FIGS. 5–8, the wall panels 10 have attached on their inner faces along their forward marginal edges molding strips 21 which may have any desirable configuration. Each molding strip extends at a right angle to a respective cleat 12 secured to the inner face of the same panel with the end of the cleat abutting the molding strip. In order to assure accurate alignment of the parts in assembly, the molding strip 21 which is provided with a squared-off end preferably is secured to the panel 10 so that the squared end is coplanar with the outer edge face of the cleat 12.

Thus, when the edges of the cleat and panel are mitered, as hereinabove described, the end of the molding strip 21 is correspondingly mitered to present a mitered surface which is continuous with that of the cleat and panel.

Each of the molding strips 21 is drilled to provide an angular bore 22, the axis of which is disposed at an angel of approximately 30° with the inner face 23 of the molding strip. The bore 22 extends from the mitered surface of the molding strip through the strip to the inner face thereof and is counter-bored as at 24 on the inner face 23, as illustrated. It will be understood that when the respective complemental mitered surfaces of the molding strips 21 are in abutting relation, the corresponding ends of the respective bores 22 are in registration.

A connecting member 26 is adapted to be received in registering bores 22. Said connecting member comprises a rod threaded at both ends and each adapted to receive a washer 17 and a cooperating nut 18. The rod is bent in the shape of a V so that the included angle between the legs is approximately 75°.

Preferably, the diameter of the bore 22 is somewhat greater than the diameter of the connecting rod 26. This facilitates assembly of the parts and permits relative adjustment and accurate alignment of cooperating parts before final tightening of the nuts. Thus, in a specific instance the diameter of the connecting member 26 is of the order of 5/32 inch while the diameter of the bore is of the order of 1/4 inch.

The components are assembled substantially in the same manner as hereinbefore described.

When the nuts are tightened compressive forces are created which effect a tight joint between co-operating components to maintain the same in assembled relation. However, the components may be readily disassembled for shipping purposes.

It will be understood that the invention is not to be limited by the specific examples with regards to shape and size of the components forming the corner construction but that said corner components may be formed in a wide range of dimensions and forms.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:
1. A mitered corner construction of the character described comprising
    (a) a pair of cooperating corner components,
    (b) each component including a panel member having a cleat attached along one marginal edge thereof and a molding strip attached along an adjacent marginal edge at a right angle to said first mentioned marginal edge,
    (c) said panel member, said cleat and said molding strip having mitered coplanar edge surfaces,
    (d) the respective surfaces of said components being in abutting engagement,
    (e) each of said cleats having an aperture extending transversely therethrough and substantially in parallel relation to the plane of said member with said apertures in registration,
    (f) an angle connecting member having screw threads at each end with each leg thereof passing through a respective aperture,
    (g) each of said molding strips having a bore therethrough extending angularly from the mitered edge surface thereof to the inner edge surface thereof and substantially parallel to the plane of said panel member, the ends of said bores at the mitered edge surfaces being in registration,
    (h) a second angle connecting member having screw threads at each end with each leg thereof passing through a respective bore,
    (i) and threaded means cooperating with the screw threads for tightening said components in rigid relation.
2. The invention as defined in claim 1 in which the axis of each bore is disposed at an angle substantially 30° with the plane of the inner edge surface of said molding strip.
3. The invention as defined in claim 1 in which the axis of each bore is disposed at an angle of substantially 30° with the plane of the inner edge surface of said molding strip and the included angle between the legs of said second angle connecting member is substantially 75°.
4. The invention as defined in claim 1 in which the second angle connecting member is generally V-shaped.
5. A mitered corner construction of the character described comprising
    (a) a pair of cooperating corner components,
    (b) each component including a panel member having a cleat attached along one marginal edge thereof and a molding strip attached along an adjacent marginal edge at a right angle to said first mentioned marginal edge,
    (c) said panel members, said cleat and said molding strip having mitered coplanar edge surfaces,
    (d) the respective mitered surfaces of said components being in abutting engagement,
    (e) each of said cleats having a plurality of apertures extending transversely therethrough and substantially in parallel relation to the plane of said member with said apertures in coplanar registration,
    (f) a plurality of angle connecting members with the leg of each connecting member passing through a respective aperture,
    (g) each of said molding strips having a bore therethrough extending angularly from the mitered edge surface thereof to the inner edge surface thereof and substantially parallel to the plane of said panel member, the ends of said bores at the mitered edge surfaces being in registration,
    (h) a generally V-shaped connecting member with each leg thereof passing through a respective bore,
    (i) and means cooperating with said connecting members for tightening said components in rigid relation.
6. A mitered corner construction of the character described comprising
    (a) a pair of cooperating corner components,
    (b) each including a molding strip attached along one marginal edge thereof,
    (c) said molding strip and said member having mitered coplanar edge surfaces,
    (d) the respective surfaces of said components being in abutting engagement,
    (e) each of said molding strips having a bore therethrough extending angularly from the mitered edge surface thereof to the inner edge surface thereof and substantially parallel to the plane of said panel member, the ends of said bores at the mitered edge surfaces being in registration,
    (f) an angle connecting member having screw threads at each end with each leg thereof passing through a respective bore, and
    (g) means cooperating with said connecting members for tightening said components in rigid relation.
7. The invention as defined in claim 6 in which the axis of each bore is disposed at an angle of substantially 30° with the plane of the inner edge surface of said molding strip.
8. The invention as defined in claim 6 in which the included angle between the legs of said second angle connecting member is substantially 75°.
9. The method of forming a mitered corner construction comprising
    (a) securing a cleat of generally rectangular cross section to a marginal edge of each of two panels,

(b) securing a molding strip to an adjacent marginal edge of each panel at a right angle to said first marginal edge with the end of said molding strip abutting said cleat,
(c) drilling a plurality of spaced apertures through each of said cleats,
(d) drilling a bore in each of said molding strips so that the bore extends angularly relative to the inner face of the molding strip,
(e) bevelling each of the assembled cleats, panels and molding strips to provide mitered coplanar edge surfaces,
(f) providing a plurality of angle connecting clamp members,
(g) inserting one leg of each of the connecting clamp members into each of the apertures and the bore of one of said cleats and said molding strips respectively,
(h) inserting the other leg of each of the connecting clamp members into each of the apertures and the bore of the other of said cleats and molding strips, respectively,
(i) abutting said mitered edge surfaces, and
(j) tightening said clamp members to secure said cleats and molding strips in abutment.

References Cited

UNITED STATES PATENTS

| | | | |
|---|---|---|---|
| 290,128 | 12/1883 | Smith et al. | 287—20.92 |
| 632,135 | 8/1899 | Miller et al. | 287—20.92 |
| 949,233 | 2/1910 | Holtgrewe | 287—20.925 |

FOREIGN PATENTS

| | | |
|---|---|---|
| 223,529 | 9/1962 | Austria. |
| 373,230 | 4/1923 | Germany. |

CARL W. TOMLIN, *Primary Examiner.*

M. PARSONS, JR., *Assistant Examiner.*